United States Patent [19]

Takizawa et al.

[11] Patent Number: 5,026,780

[45] Date of Patent: Jun. 25, 1991

[54] WATER SWELLABLE RESIN COMPOSITION

[75] Inventors: Minoru Takizawa, Moriya; Michiei Nakamura, Soka; Hitoshi Takeuchi, Showa; Shigeru Sakamoto, Kuki; Shojiro Horiguchi, Omiya, all of Japan

[73] Assignee: Dainichiseika Color & Chemicals Mfg. Co., Ltd., Tokyo, Japan

[21] Appl. No.: 590,518

[22] Filed: Sep. 28, 1990

Related U.S. Application Data

[63] Continuation of Ser. No. 329,779, Mar. 28, 1989, abandoned.

[30] Foreign Application Priority Data

Mar. 31, 1988 [JP] Japan ................... 63-076204

[51] Int. Cl.$^5$ ................ C08F 265/02; C08L 53/02; C08L 51/06; C08K 9/06
[52] U.S. Cl. .................................... 525/301; 525/64; 525/66; 525/71; 525/76; 525/77; 525/78; 525/80; 525/86; 524/588; 524/589; 524/599

[58] Field of Search ................ 525/301, 64, 66, 71, 525/76, 77, 78, 80, 86

[56] References Cited

U.S. PATENT DOCUMENTS 4,085,168  4/1978  Milkovich et al. ............... 525/301

OTHER PUBLICATIONS

"Macromolecular Reviews", Peterlin et al. (eds), vol. 2, pp. 73–82, Interscience.

*Primary Examiner*—John C. Blutge
*Assistant Examiner*—Vasu S. Jagannathan
*Attorney, Agent, or Firm*—Oblon, Spivak, McClelland, Maier & Neustadt

[57] ABSTRACT

A water swellable resin composition comprises a water swellable resin and a medium such as a plasticizer, solvent, resin or resin solution. The resin is an alkali metal salt and/or hydrophilic amine salt of a copolymer of hydrophobic polymer chains having an $\alpha,\beta$-ethylenically-unsaturated group at end thereof and a monomer composed principally of (meth)acrylic acid.

1 Claim, No Drawings

WATER SWELLABLE RESIN COMPOSITION

BACKGROUND OF THE INVENTION

1) Field of the Invention

This invention relates to a water swellable resin composition, and more specifically to a water swellable resin composition useful as sealing compounds, waterproofing agents, water-holding agents, dew-preventing agents, water-penetration preventing materials, sweat-absorbing materials, sanitary napkins, etc.

2) Description of the Prior Art

As water swellable resins known to date, there are, for example, crosslinked products of water-soluble resins, resins formed by graft-polymerizing a water-soluble monomer on starch or the like, and block copolymers composed of a hydrophilic resin and a hydrophobic resin.

The crosslinked products of the water-soluble resins involve the problem that when they have a low crosslinking degree, excreted portion into water increases although they exhibit high swellability and when they have a high crosslinking degree, their swellability is reduced although they are not dissolved into water. High swellability and water insolubility are thus contradictory. They are used as dispersions in an organic solvent, because it is difficult to use them alone. They however have low compatibility with organic solvents, so that various problems exist.

The grafted products use a natural material as a base material. They are hence accompanied by the drawback that they are biodegradable and have poor long-term stability in a wet state. They also involve the problem that their compatibility with organic solvents is low.

On the other hand, the water swellable resins of the block copolymer type are excellent in swellability, wet stability, compatibility with organic solvents, etc. Their production processes are however trouble-some, leading to the drawback that their application fields are limited.

SUMMARY OF THE INVENTION

An object of this invention is therefore to provide a water swellable resin composition which is free of the above-described drawbacks and problems of the prior art.

In one aspect of this invention, there is thus provided a water swellable resin composition comprising a water swellable resin and a medium, wherein the resin is an alkali metal salt and/or hydrophilic amine salt of a copolymer of hydrophobic polymer chains having an $\alpha,\beta$-ethylenically-unsaturated group at end thereof and a monomer composed principally of (meth)acrylic acid. The term "(meth)acrylic acid" as used herein means acrylic acid and/or methacrylic acid.

The alkali metal salt and/or hydrophilic amine salt of the copolymer of the hydrophobic polymer chains having the E,$\beta$-ethylenically-unsaturated group at the end thereof and the monomer composed principally of (meth)acrylic acid has excellent compatibility with the medium as well as high swellability, high wet stability, water insolubility and the like. The water swellable resin composition of this invention is therefore useful for various applications.

DETAILED DESCRIPTION OF THE INVENTION AND PREFERRED EMBODIMENTS

The present invention will next be described in more detail by preferred embodiments.

The water swellable resin which primarily features this invention is obtained by copolymerizing hydrophobic polymer chains having an $\alpha,\beta$-ethylenically-unsaturated group at end thereof with a monomer composed principally of (meth)acrylic acid and then converting the resultant copolymer into salts or a salt with an alkali metal and/or hydrophilic amine.

The hydrophobic polymer chains having the $\alpha,\beta$-ethylenically-unsaturated group at the end thereof, which is useful in the practice of this invention, may acrylic ester, acrylonitrile or the like, said homopolymer or copolymer having at an end thereof an $\alpha,\beta$-ethylenically-unsaturated group such as a (meth)acryloyl group.

Such hydrophobic polymer chains can be obtained in the following manner. The polymerization of the above-mentioned monomer is conducted by using an initiator containing one or more functional groups, for example, an azo-type initiator such as 3,3'-azobis-3-cyanobutyric acid, 4,4'-azobis-4-cyanovaleric acid, 4,4'-azobis-4-cyano-1-pentanol or 2,2'-azobis-2-cyanopropanol, or a peroxide such as hydrogen peroxide, succinic peroxide or glutaric peroxide, or by using a chain transfer agent containing one or more functional groups, such as thioglycol, thioglycerin, thioglycolic acid, thiosuccinic acid or thiopropionic acid, whereby a hydroxyl or carboxyl group is introduced into an end of the resultant polymer. Using such a functional group, the polymer is reacted, for example, with (meth)acrylic acid, hydroxyalkyl (meth)acrylate, glycidyl (meth)acrylate, maleic anhydride or the like so that an $\alpha,\beta$-ethylenically-unsaturated group is introduced into the end.

Hydrophobic polymer chains having an $\alpha,\beta$-ethylenically-unsaturated group at end thereof, such as those described above, are called a "macromer" or "macromonomer". A variety of macromers or macromonomers are available and usable in this invention. Although the hydrophobic polymer chains can have any molecular weight, an unduly low molecular weight results in a water swellable resin having high water solubility while an excessively high molecular weight leads to insufficient water swellability. The preferable molecular weight therefore ranges from 1,000 to 20,000, preferably from 1,500 to 15,000.

The monomer copolymerized with the above macromer is composed principally of (meth)acrylic acid. So long as the object of this invention is not impaired, one or more other hydrophobic and/or hydrophilic monomers may also be used in combination, for example, nonionic monomers such as hydroxyethyl (meth)acrylate, polyethylene glycol mono(meth)acrylate and polyethylene glycol monoalkyl ether mono(meth)acrylates, and anionic monomers such as potassium sulfopropylmethacrylate, sodium styrenesulfonate, 2-acrylamido-2-methylpropanesulfonic acid and mono(2-methacryloyloxyethyl)acid phosphate.

Copolymerization of polyethylene glycol mono(meth)acrylate and/or a polyethylene glycol monoalkyl ether mono(meth)acrylate, said alkyl having 1–12 carbon atoms, is particularly preferred, because the dispersion stability in a liquid medium and swelling speed of the resultant resin are improved significantly. Each of these nonionic monomers may be used in an amount such that it accounts for not more than 70 wt.%, preferably 0.5–30 wt.% of a copolymer to be obtained.

To give a crosslinked structure to the copolymer, it is also possible to use in combination a small amount of a polyfunctional monomer such as diethylene glycol diacrylate, diethylene glycol dimethacrylate, p-divinylbenzol, trimethylolpropane triacrylate, 1,6-hexanediol diacrylate, neopentylglycol diacrylate, dipentaerythritol hexacrylate, an addition production of 1 mole of dipentaerythritol hexacrylate and 1–3 mole of thioglycolic acid (or the sodium salt thereof) or N,N'-methylenebisacrylamide. Each of these polyfunctional monomers may be used in an amount such that it accounts for not more than 5 wt.%, preferably 0.1–3 wt.% of a copolymer to be obtained.

When a hydrophobic block copolymer or hydrophobic graft copolymer represented by (A)-(B)-(A), (A)-(B)]$_n$ or (A)$_n$-B wherein n stands for a value of at least 1, A means polystyrene or polymethyl methacrylate and B denotes polybutadiene or polyisoprene is contained, the copolymer acts as a dispersion stabilizer for monomers in the reaction system upon copolymerization. As a result, a uniform copolymer dispersion is obtained and further, the hydrophobic copolymer acts as a physical crosslinking agent or reinforcing agent connecting hydrophobic polymer chains in the resultant copolymer. The water swellable resin is therefore dissolved less in water. It is hence preferable to use such a hydrophobic block copolymer or hydrophobic graft copolymer. Particularly preferred are block or graft copolymers of the (A)-(B)-(A) type. Each of these block or graft copolymers may be used in an amount such that it accounts for not more than 5 wt.%, preferably 0.5–5 wt.% of the resulting copolymer (water swellable resin).

Regarding the ratio of the macromer to (meth)acrylic acid to be copolymerized, the resulting copolymer has insufficient water swellability if (meth)acrylic acid is used too little and the water insolubility of the resulting copolymer is reduced if (meth)acrylic acid is used too much. It is therefore preferable to use the macromer in an amount such that it accounts for about 2–60 wt.% of a copolymer to be obtained. On the other hand, it is preferred for (meth)acrylic acid to be used in an amount such that it accounts for about 20–95 wt.% of the copolymer to be obtained.

It is preferable to conduct the polymerization in a good solvent for the macromer, for example, cyclohexane, toluene, xylol, mineral turpentine, naphthene, methyl ethyl ketone, dioxane, dimethylformamide, or a mixture thereof. No particular limitation is imposed on the polymerization process itself and a conventionally-known solution polymerization process using a radical polymerization initiator or a like process may be applied.

The water swellable resin useful in the practice of this invention can be obtained by neutralizing carboxyl groups, which are contained in the copolymer thus obtained, with an alkali metal such as lithium, sodium or potassium or with a hydrophilic amine whose boiling point is preferably at least 150° C., for example, a mono-, di- or triethanol amine or the like. If the hydrophilic amine has a low boiling point like ammonia or methylamine, ammonia or methylamine are liberated to change the water swellability of the water swellable resin. It is therefore not preferred to use such a low-boiling hydrophilic amine.

The degree of neutralization may range from 50 equivalent % to 100 equivalent %, preferably from 60 to 80 equivalent % of the carboxyl groups in the copolymer. It is not preferable to use an alkali in any excess amount, because there is a potential problem that the copolymer may undergo hydrolysis. Any neutralization method may be used. It is however preferred to conduct the neutralization in the copolymerization solvent after the copolymerization. Since the copolymer thus neutralized precipitates as fine particles of several micrometers and smaller, the resultant dispersion is a water swellable resin composition of this invention which can be used as a coating formulation or an impregnating liquid formulation either as is or after the incorporation of one or more additives such as a binder.

As an alternative, in this invention, the water swellable resin may be separated from the above dispersion and then converted into a solid or powder form by methods known per se in the art. The water swellable resin may thereafter be dispersed in another medium.

The medium useful in the practice of this invention is a natural or synthetic polymer or a non-aqueous liquid medium which may contain such a polymer. As preferable solid media such as natural and synthetic polymers, may be mentioned natural rubber, polybutadiene, polyisoprene, polyisobutylene, butadiene-styrene copolymer, butadiene-acrylonitrile copolymer, polychloroprene, ethylene-propylene rubber, acrylic polymers, ethylene-vinyl acetate copolymer, polyvinylbutyral resin, silicone rubbers, urethane rubber and the like. As copolymers, random copolymers, graft copolymers and block copolymers are all usable. Of these, block copolymers of the teleblock, multiblock or radialblock type are excellent in strength and are thus preferred.

The non-aqueous liquid medium may be added directly to the water swellable resin or may be added to the above-mentioned solid medium to improve the flexibility, the processability, the feeling to contact, etc. Usual organic solvents such as those described above, plasticizers, process oil, oils, liquid paraffin and vaseline, as well as liquid polymers such as polyisobutene are preferred.

Solid and liquid media such as those described above may be added directly. It is also preferable to use them in a form either dissolved or dispersed in an organic solvent.

In spite of the ionic nature of the water swellable resin useful in the practice of this invention, it is insoluble in water, insoluble or hardly soluble in organic solvents in many instances, and is infusible.

It is thus preferred for the water swellable resin of this invention to be used in the form of fine powder or in the form of a dispersion in an organic solvent. As a means for mixing the water swellable resin with the above-described solid or liquid medium or with a solution or dispersion of the medium in an organic solvent, may preferably be used a dispersing machine or mixing machine known conventionally, such as a roll mill, Banbury mixer, kneader, dissolver, ball mill, sand mill or the like.

The essential components of the water swellable resin composition of this invention have been described above. In addition, it is also possible to incorporate one or more of various other additives as desired depending on the application purpose or the like. For example, water, surfactants, perfume bases, various dyes and pigments, various fillers, ultraviolet absorbers, stabilizers, foaming agents, various inorganic salts, various alkaline agents, various acidic agents, etc. may be used in combination in amounts as needed.

In the water swellable resin employed upon addition of the above-described components, its ionic groups may be either in the free form or in the form of a salt. This is determined in accordance with the application purpose. A water swellable resin whose ionic groups are in the free form may be neutralized to convert each group into a salt form in an intermediate step or in the final step in the course of the production of the resin composition. Depending on the kind of the ionic groups, a suitable alkaline or acidic agent may be mixed so that the ionic groups may be neutralized upon absorption of water.

The water swellable resin composition of this invention make take various forms. Roughly divided, it is either solid or liquid at room temperature. In the case of the solid form, it may be in the form of powder, pellets, granules, various shaped products, fibers, impregnated products or the like. Further, it may be provided in the form of a so-called master batch or a final product. As such solid products, may be mentioned highly hygroscopic fibers; base materials for synthetic leathers; water stop agents for joint fillers useful for various buildings and underground constructions; sanitary and medical supplied such as disposal diapers, sanitary napkins and water-containing cool pillows; water-penetration preventing agents for optical communication cables, power cables and conventional communication cables; water-holding agents for soil; water-holding agents for the rearing of seedlings; sweat- and moisture-absorbing base materials for shoes and insoles; agricultural and fishery materials such as heat-insulating wrapping materials for fish and fruits.

On the other hand, as paste or liquid products, may be mentioned paints, coating materials, treating agents, printing inks and the like. Particularly useful are paints. For example, when such a paint is applied to joints, cracked portions or connected parts of various buildings, these gaps are filled up. Moreover, when water begins to penetrate into the gaps after they have been filled up, the thus-applied paint is caused to expand further by the water so that the penetration of any further water can be prevented completely. In particular, the composition of this invention reversibly undergoes repeated expansion when ever exposed to water so that long-term waterproofing effects can be expected. In addition, the use of a liquid composition according to this invention as an impregnant for various articles, for example, woven fabric or non-woven fabric, the properties of these articles can be modified. When applied to the surfaces of dew-forming materials such as various plastic films or glass or metal plates, superb dew-preventing effects are exhibited.

As has been described above, the water swellable resin useful in the practice of this invention has significant advantages owing to its structure. Namely, its hydrophilic groups are ionic so that its water absorbing velocity of water swelling velocity is high and its water absorbing ability or swellability is very large.

Moreover, because of the restraining action by the hydrophobic polymer chains in its structure, the water swellable resin is not dissolved or excreted into water to any substantial extent.

The holding of the water-swollen mass is achieved by the restraining action of the hydrophobic polymer chains so that the water swellable resin useful in the practice of this invention is superior in physical strength to conventional water swellable resins which are held at crosslinked points.

This invention will hereinafter be described more specifically by the following examples, in which all designations of "part" or "parts" and "%" mean part or parts by weight and wt.% unless otherwise specifically indicated.

EXAMPLE 1

Using a 30:40:40 mixture of cyclohexane, toluene and methyl ethyl ketone as a solvent and 1 part of $\alpha,\alpha'$-azobisisobutyronitrile as a polymerization initiator, polymerizable polystyrene-which contained methacryloyl group as $\alpha,\beta$-ethylenically-unsaturated group at end thereof and had a molecular weight of about 7,000-and acrylic acid were polymerized at each of weight ratios of 60:40, 40:60, 30:70 and 25:75 at 50°-60° C. for 6 hours in a polymerization vessel. Thereafter, caustic soda was added to neutralize 75 equivalent % of the carboxyl groups of the polymer. The resultant dispersion was in an emulsified state. Particles thus formed had particle sizes in a range of 0.1-2 $\mu$m. A mass which had been obtained by drying the dispersion was immersed in water for 24 hours and the amount of water thus absorbed was measured to determine the water swelling degree. The results are given below.

Incidentally, the term "water swelling degree" means a value obtained by dividing the weight of a sample after absorption of water and swelling with the weight of the same sample before the absorption of water and swelling.

| Water swellable resin | Water swelling degree (times) |
| --- | --- |
| (1) Acrylic acid - 40% | 10 |
| (2) Acrylic acid - 60% | 30 |
| (3) Acrylic acid - 70% | 50 |
| (4) Acrylic acid - 75% | 100 |

Next, the water swellable resin with 60% of acrylic acid were kneaded with light process oil at the following varied weight ratios, followed by formation into strands. Their water swelling degrees were measured in a similar manner as described above. The following results were obtained.

| Water swellable resin/process oil | Water swelling degree (times) |
| --- | --- |
| (1) 90/10 | 33.0 |
| (2) 80/20 | 38.8 |
| (3) 70/30 | 40.7 |
| (4) 60/40 | 32.7 |
| (5) 50/50 | 27.0 |

Such water swellable resin compositions of this invention are also useful as water-holding agents.

EXAMPLE 2

In a similar manner as in Example 1, 26.3 parts of polymerizable polystyrene having end methacryloyl group (average molecular weight: about 6,000), 73.7 parts of acrylic acid were copolymerized in the presence of 4.7 parts of a block copolymer of the (polystyrene)-(polybutadiene)-(polystyrene) type (polystyrene content: 30%; average molecular weight: about 200,000), followed by neutralization to obtain a water swellable resin. Its water swelling degree was 50 times.

The water swellable resin was kneaded with a plasticizer (dioctyl adipate, DOA) at the following varied weight ratios, followed by formation into strands to obtain water swellable resin compositions according to this invention.

The thus-formed products had the following varied water swelling degrees.

| Water swellable resin/DOA | Water swelling degree (times) |
| --- | --- |
| 90/10 | 64.8 |
| 80/20 | 98.8 |
| 70/30 | 74.0 |

From the above table, it is appreciated that the addition of the plasticizer is effective up to 20% DOA.

The water swellable resin used in this example has excellent durability in water and shows superb stability as a dispersion. It is hence useful as a coating formulation which is applied as a mixture with a rubbery material. It is also useful as a water-holding agent, sealing agent or dew-preventing agent.

EXAMPLE 3

In a similar manner as in Example 1, 25 parts of polymerizable polymethyl methacrylate having end methacryloyl group (average molecular weight: about 10,000), 75 parts of acrylic acid were copolymerized in the presence of 1 part of a block copolymer of the (polystyrene)-(polyisoprene)-(polystyrene) type (polystyrene content: 20%; average molecular weight: about 100,000) using 1 part of $\alpha,\alpha'$-azobisisobutyronitrile in a mixes solvent composed of 320 parts of methyl ethyl ketone and 80 parts of toluene, followed by neutralization to obtain a stable emulsion-like dispersion. The water swelling degree of its dried product was about 40 times. The dispersion is therefore useful as an impregnant for dew-preventing non-woven fabrics.

EXAMPLE 4

In a similar manner as in Example 3, 25 parts of polymerizable polymethyl methacrylate having end methacryloyl group (average molecular weight: about 10,000), 5 parts of polymerizable polybutyl acrylate having end methacryloyl group (average molecular weight: about 12,000), 70 parts of acrylic acid were copolymerized using 1.5 parts of lauroyl peroxide, followed by neutralization to obtain a water swellable resin. Its water swelling degree was 60 times.

A canvas was coated with a water swellable coating formulation, which had been obtained by adding acrylic rubber to a dispersion of the water swellable resin, and then dried. The thus-coated canvas had excellent water-proofness and air permeability.

EXAMPLE 5

In a mixture of 200 parts of cyclohexane, 30 parts of toluene and 1.8 parts of sorbitol monostearate, were polymerized at 65° C. 2 parts of polymerizable polystyrene having end methacryloyl group (average molecular weight: about 15,000), 71.5 parts of a 40% aqueous solution of sodium acrylate, 1.3 parts of a 57% aqueous solution of the addition product of 1 mole of dipentaerythritol hexacrylate and 3 moles of sodium thioglycolate and 7.1 parts of acrylic acid in the presence of, 2 parts of a block copolymer of the (polystyrene)-(polybutadiene)-(polystyrene) type (polystyrene content: 30%; average molecular weight: about 150,000) using 0.1 part of potassium persulfate. A precipitate was washed with methanol and then dried. The resultant water swellable resin had a water swelling degree of about 350 times.

A composition obtained by mixing and kneading a ground product of the water swellable resin with chloroprene rubber is useful as a water stop material for sealing materials.

EXAMPLE 6

A water swellable resin was obtained in the same manner as in Example 3 except that acrylic acid was replaced by methacrylic acid and potassium hydroxide was used as a neutralizing agent. The water swelling degree of the resin was 30 times. It has excellent durability in the same application fields as those described in Example 3.

EXAMPLE 7

A water swellable resin was obtained in the same manner as in Example 2 except for the substitution of triethanolamine for the neutralizing agent. The water swelling degree of the resin was 3 times. It showed good film-forming property when applied to a non-woven fabric without any reinforcing material. The thus-coated non-woven fabric exhibited superb property as a sweat-absorbing material.

EXAMPLE 8

A water swellable resin having a water swelling degree of 50 times was obtained as a dispersion in the same manner as in Example 3 except that a polymerizable polyacrylonitrile-polystyrene copolymer having end methacryloyl group (polyacrylonitrile content: 25%; average molecular weight: about 6,000) instead of the polymerizable polymethyl methacrylate.

The resin was caused to deposit with isopropyl alcohol. It was collected by filtration, dried, ground, and then mixed and kneaded with a styrene-butadiene block copolymer. The resultant composition was useful as a sealing material.

EXAMPLE 9

In a 30:30:20:20 (by weight) mixture of cyclohexane, methyl ethyl ketone, toluene and methanol, were copolymerized 10 parts of polymerizable polystyrene having methacryloyl group as $\alpha,\beta$-ethylenenically-unsaturated group at end thereof and having a molecular weight of about 5,500, 15.2 parts of polybutyl acrylate having similar terminal methacyloyl group and having an average molecular weight of about 6,000, 10 parts of polyethylene glycol monomethacrylate (average molecular weight of the polyethylene glycol: about 450), 18.9 parts of acrylic acid and 92.8 parts of sodium acrylate in the presence of 1.2 parts of a block copolymer of the (polystyrene)-(polybutadiene)-(polystyrene) type (polystyrene content: 40%, average molecular weight: about 150,000) using 1.2 parts of azobisisobutyronitrile. The polymerization mixture was concentrated to obtain a dispersion of a water swellable resin. The solid content of the dispersion was 40%. The average particle size of the dispersed particles was 0.3 $\mu$m.

A non-woven fabric was coated with the dispersion and then dried. The thus-coated non-woven fabric was useful as a water-penetration preventing tape for optical communication cables.

EXAMPLE 10

A water swellable resin having a water swelling degree of 100 times was obtained by copolymerizing 8 parts of polymerizable polystyrene having end methacryloyl group (average molecular weight: about 10,000), 12 parts of polymerizable polybutyl acrylate having end methacryloyl group (average molecular weight: about 7,000) and 80 parts of sodium acrylate in the presence of 0.5 part of a block copolymer of the (polystyrene)-(polyisoprene)-(polystyrene) type (polystyrene content: 30%, average molecular weight: about 200,000). A water swellable resin composition according to this invention was then obtained by mixing 38 parts of a dispersion, which had been obtained by dispersing the water swellable resin finely to 1–5 μm in a mixed solvent system of cyclohexane, toluene and methanol and had a solid content of 30%, 57 parts of a 20% solution of "ASAPRENE T-431" (trade name; product of Asahi Chemical Industry Co., Ltd.), 5 parts of process oil, 250 parts of kerosine and a trace amount of a perfume base.

After coating the polypropylene-made blades of a ventilating fan with the above composition and drying the composition, the ventilating fan was actually used as was for 1 month. The coating was brought into contact with water, whereby the coating was caused to swell for its remmoval. The coating was peeled off with extreme ease and the surface appeared without any dirt. The composition was therefore useful as a cleaning agent.

EXAMPLE 11

A water swellable resin composition according to this invention was obtained by mixing 72.8 parts of a dispersion of the same high-molecular water swellable resin using acrylic acid instead of sodium acrylate as that used in Example 9 having a solid content of 30%, 27.2 parts of a 20% solution of chloroprene in toluene and 100 parts of methyl ethyl ketone.

The surface of an aluminum molded product was spraycoated with the above composition, followed by drying to form a coating. After allowing the aluminum molded product to stand for 1 month as was, it was immersed for about 1 hour in a 10% aqueous solution of sodium acetate and was then washed with water. The coating underwent swelling, so that it was easily peeled off to present the surface without any dirt. The composition was therefore useful as an cleaning agent.

EXAMPLE 12

A water swellable resin composition according to this invention was obtained by mixing 30 parts of a dispersion, which had been obtained by diluting to the solid content of 30% the water swellable resin composition of Example 9, 57 parts of a 20% "ASAPRENE T-431" solution, 5 parts of process oil, 250 parts of kerosine and a trace amount of a perfume base.

A window glass which had become dirty with dust, dirt and the like was spray-coated with the above composition of this invention. After drying the thus-coated composition at room temperature, water was sprayed against the surface of the window glass so that the coating was caused to swell. When the coating was peeled off from the window glass, the dirt was removed along with the coating thus peeled off so that the composition was useful as a cleaning agent.

EXAMPLE 13

The composition (solid content: 40%) of Example 9 and polyurethane elastomer (polyether type; viscosity: about 200 cps at 25° C.; solid content: 25%) were mixed at a ratio of 85:15 by solid weight to obtain a water swellable resin composition according to this invention. A polyester/rayon non-woven fabric having a basis weight of 92 g/m² (thickness: about 300 μm) was coated with the resultant slurry to give a solid coat weight of 60 g/m². the thus-coated non-woven fabric was then dried. It had water absorbing capacity of about 1,700 g/m² and its strength was not reduced even when it absorbed water. It was therefore useful as a dew-preventing sheet.

EXAMPLE 14

A polyester non-woven fabric having a basis weight of 70 g/m² (thickness: about 200 μm) was coated with a polyurethane elastomer (polyether type) having a viscosity of about 200 poise at 25° C. to give a coat weight of about 15 g/m² on solids basis. The thus-coated elastomer was dried to form a peelable layer. Over the peelable layer, the water swellable resin composition of Example 9 was coated at a rate of 25 g/m² on solids basis, followed by drying. Over the surface, a 5:95 (by solid weight) mixture of a 15% acrylic rubber solution and the water swellable resin composition of Example 9 was applied further at a rate of about 40 g/m² (by solids). The thus-obtained sheet was useful as a water-penetration preventing tape suitable for use upon breakage of optical communication cables.

EXAMPLE 15

In a 30:30:20:20 (by weight) mixture of cyclohexane, methyl ethyl ketone, toluene and methanol, were copolymerized 0.4 part of polymerizable polystyrene having methacryloyl group as $\alpha,\beta$-ethylenically-unsaturated group at end thereof and having a molecular weight of about 5,500, 15.7 parts of polybutyl acrylate having similar terminal methacyloyl group and having an average molecular weight of about 6,000, 73.3 parts of polyethylene glycol monomethacrylate (average molecular weight of the polyethylene glycol: about 450), 7.9 parts of acrylic acid and 31.5 parts of sodium acrylate in the presence of 1.2 parts of a block copolymer of the (polystyrene)-(polybutadiene)-(polystyrene) type (polystyrene content: 40%; average molecular weight: about 150,000) using 1.2 parts of azobisisobutyronitrile, thereby obtaining a paste-like dispersion containing 27% by solids of a water swellable resin thus formed. The water swellable resin had a significantly-improved water absorbing velocity.

EXAMPLE 16

A polyester non-woven fabric having a basis weight of 70 g/m² (thickness: about 200 μm) was coated with a polyurethane elastomer (polyether type) having a viscosity of about 200 poise at 25° C. to give a coat weight of about 15 g/m² on solids basis. The thus-coated elastomer was dried to form a peelable layer. Over the peelable layer, the water swellable resin composition of Example 9 was coated at a rate of 25 g/m² on solids basis, followed by drying. Over the surface, a 5:85.5:9.5 (by solid weight) mixture of a 15% acrylic rubber solution, the water swellable resin composition of Example 9 and the water swellable resin composition of Example 15 was applied further at a rate of about 30 g/m² (by solids). The thus-obtained sheet was useful as a water-penetration preventing tape suitable for use upon breakage of optical communication cables. It exhibited perfect water stopping effect in 15-40 seconds after contact with water.

We claim:

1. A water swellable resin composition comprising a water swellable resin, a hydrophobic block copolymer or hydrophobic graft copolymer and a medium, wherein said water swellable resin is an alkali metal salt and/or hydrophilic amine salt of a polymer, wherein said polymer is a copolymer of a hydrophobic polymer chain having an $\alpha,\beta$-ethylenically-unsaturated group at an end thereof and a monomer composed principally of (meth)acrylic acid, wherein said medium is selected from the group consisting of natural rubber, polybutadiene, polyisoprene, polyisobutylene, butadiene-styrene copolymers, butadiene-acrylonitrile copolymers, polychloroprene, ethylene-propylene rubber, acrylic polymers, ethylene-vinyl acetate copolymers, polyvinylbutyral resins, silicone rubbers, urethane rubbers, organic solvent, plasticizer, process oil, liquid paraffin, and vaseline, and wherein said hydrophobic block copolymer or hydrophobic graft copolymer is represented by (A)-(B)-(A), wherein A is polystyrene or poly(methyl methacrylate) and B is polybutadiene or polyisoprene and said hydrophobic block copolymer or hydrophobic graft copolymer amounts to from 0.5 wt.% to 5 wt.% of the said copolymer of the hydrophobic polymer chain.

* * * * *